US008553938B2

(12) United States Patent
Makino et al.

(10) Patent No.: US 8,553,938 B2
(45) Date of Patent: Oct. 8, 2013

(54) INFORMATION PROCESSING PROGRAM, INFORMATION PROCESSING SYSTEM, INFORMATION PROCESSING APPARATUS, AND INFORMATION PROCESSING METHOD, UTILIZING AUGMENTED REALITY TECHNIQUE

(75) Inventors: Kozo Makino, Kyoto (JP); Keisuke Kikuchi, Yokohama (JP); Yutaka Fukaya, Yokohama (JP)

(73) Assignee: Nintendo Co., Ltd., Kyoto (JP)

( * ) Notice: Subject to any disclaimer, the term of this patent is extended or adjusted under 35 U.S.C. 154(b) by 103 days.

(21) Appl. No.: 13/366,833

(22) Filed: Feb. 6, 2012

(65) Prior Publication Data
US 2013/0051616 A1 Feb. 28, 2013

(30) Foreign Application Priority Data

Aug. 31, 2011 (JP) ................................. 2011-189098

(51) Int. Cl.
*G06K 9/00* (2006.01)
*H04N 5/225* (2006.01)
(52) U.S. Cl.
USPC ......................................... 382/103; 348/169
(58) Field of Classification Search
USPC ................. 382/100, 103, 235, 276, 307, 309;
348/169, 170, 171, 172, 208.2, 333.02, 348/460, 473, 563
See application file for complete search history.

(56) References Cited

U.S. PATENT DOCUMENTS 7,911,503 B2 * 3/2011 Kobayashi ................. 348/222.1
8,212,813 B2 * 7/2012 Furuhashi ..................... 345/421

OTHER PUBLICATIONS

Kato et al., "An Augmented Reality System and its Calibration based Marker Tracking", *Transactions of the Virtual Reality Society of Japan*, 1999, vol. 4, No. 4 w/ English Abstract, 10 pages.

\* cited by examiner

*Primary Examiner* — Abolfazl Tabatabai
(74) *Attorney, Agent, or Firm* — Nixon & Vanderhye P.C.

(57) ABSTRACT

An exemplary embodiment provides an information processing program. The information processing program includes image obtaining instructions, search target detection instructions, distance calculation instructions, event occurrence instructions, virtual image generation instructions, and display control instructions. The search target detection instructions cause a computer to detect a search target from an image of a subject. The event occurrence instructions cause the computer to cause an event to occur in a virtual space in accordance with a distance between an image pick-up apparatus and the search target. The virtual image generation instructions cause the computer to generate a virtual image by shooting the event with a virtual camera. The display control instructions cause a display to display the virtual image such that the virtual image is visually recognized by a user as superimposed on the image of the subject or on the subject seen through a screen of the display.

12 Claims, 14 Drawing Sheets

INFORMATION PROCESSING PROGRAM, INFORMATION PROCESSING SYSTEM, INFORMATION PROCESSING APPARATUS, AND INFORMATION PROCESSING METHOD, UTILIZING AUGMENTED REALITY TECHNIQUE

This nonprovisional application is based on Japanese Patent Application No. 2011-189098 filed with the Japan Patent Office on Aug. 31, 2011, the entire contents of which are hereby incorporated by reference.

FIELD

The invention generally relates to an information processing program, an information processing system, an information processing apparatus, and an information processing method, utilizing an augmented reality technique.

BACKGROUND AND SUMMARY

An image pick-up apparatus such as a camera has conventionally employed a technique for detecting a prescribed image pick-up target from a picked-up image of a subject (picked-up image). For example, in an augmented reality technique, a technique for detecting a marker by subjecting a marker (a search target) included in an image picked up by a camera to image recognition processing (a marker detection technique) has been known.

An exemplary embodiment provides an information processing program, an information processing system, an information processing apparatus, and an information processing method, capable of causing an event as intended by a user to occur by making use of a detected marker (a search target).

An exemplary embodiment provides a non-transitory storage medium encoded with a computer readable information processing program and executable by a computer of an information processing apparatus. The information processing apparatus is connected to an image pick-up apparatus and a display. The information processing program includes image obtaining instructions, search target detection instructions, distance calculation instructions, event occurrence instructions, virtual image generation instructions, and display control instructions. The image obtaining instructions cause the computer to obtain an image of a subject picked up by the image pick-up apparatus. The search target detection instructions cause the computer to detect a search target from the image of the subject obtained in accordance with the image obtaining instructions. The distance calculation instructions cause the computer to calculate a distance between the image pick-up apparatus and the search target based on the image of the subject. The event occurrence instructions cause the computer to cause an event to occur in a virtual space in accordance with the distance between the image pick-up apparatus and the search target calculated in accordance with the distance calculation instructions. The virtual image generation instructions cause the computer to generate a virtual image by shooting the event that occurs in accordance with the event occurrence instructions with a virtual camera arranged in the virtual space. The display control instructions cause the display to display the virtual image such that it is visually recognized by a user as superimposed on the image of the subject or on the subject seen through a screen of the display.

According to the exemplary embodiment, since an event can be caused to occur in the virtual space in accordance with the calculated distance between the image pick-up apparatus and the search target, an event as intended by the user can be caused to occur by utilizing the detected search target.

In an exemplary embodiment, the event occurrence instructions are adapted to cause the event to occur when the distance between the image pick-up apparatus and the search target calculated in accordance with the distance calculation instructions is equal to or smaller than a prescribed distance.

According to the exemplary embodiment, as the user brings the image pick-up apparatus closer to the search target to set the calculated distance between the image pick-up apparatus and the search target to a distance equal to or smaller than the prescribed distance, an event as intended by the user can be caused to occur.

In an exemplary embodiment, the search target includes a first search target and a second search target arranged as encompassed in the first search target, and the event occurrence instructions are adapted to cause a first event to occur when a distance between the image pick-up apparatus and the first search target is equal to or smaller than a first distance and to cause a second event to occur when a distance between the image pick-up apparatus and the second search target is equal to or smaller than a second distance.

According to the exemplary embodiment, an event as intended by the user can be caused to occur based on the distance between the image pick-up apparatus and the first search target and the distance between the image pick-up apparatus and the second search target.

In an exemplary embodiment, the search target includes a first search target and a plurality of second search targets arranged as encompassed in the first search target, and the event occurrence instructions are adapted to cause the event to occur in accordance with a second search target, among the plurality of second search targets, of which distance from the image pick-up apparatus is equal to or smaller than a prescribed distance.

According to the exemplary embodiment, a specific second search target can be selected from the plurality of second search targets based on the distance between the image pick-up apparatus and the second search target, and an event as intended by the user can be caused to occur.

In an exemplary embodiment, the event occurrence instructions are adapted to cause a first event to occur when a distance between the image pick-up apparatus and the first search target is equal to or smaller than a first distance and to cause a second event to occur when the distance of a second search target, among a plurality of the second search targets, from the image pick-up apparatus is equal to or smaller than the prescribed distance.

According to the exemplary embodiment, an event as intended by the user can be caused to occur based on the distance between the image pick-up apparatus and the first search target and the distance between the image pick-up apparatus and the second search target.

In an exemplary embodiment, the event occurrence instructions are adapted to cause a first event to occur when the first search target is detected and to cause a second event to occur when the distance of a second search target, among the plurality of the second search targets, from the image pick-up apparatus is subsequently equal to or smaller than the prescribed distance.

According to the exemplary embodiment, a first event is caused to occur when the first search target is detected, and a second event is caused to occur by subsequently bringing the image pick-up apparatus closer to the second search target. Therefore, the first event and the second event can be caused to occur as intended by the user.

In an exemplary embodiment, the event that occurred in accordance with the event occurrence instructions includes arrangement of an object in a prescribed shape in the virtual space, and the virtual image generation instructions are adapted to generate the virtual image by shooting the object in the prescribed shape with the virtual camera.

According to the exemplary embodiment, since an object in a prescribed shape is displayed in accordance with an event, as compared with a case where an object is simply displayed at a position corresponding to the search target, more visual effects for having the user actually feel augmented reality can be provided.

In an exemplary embodiment, the event that occurred in accordance with the event occurrence instructions includes arrangement of a plate-shaped polygon in the virtual space, and the virtual image generation instructions are adapted to generate the virtual image by mapping a texture on the plate-shaped polygon and shooting the polygon with the virtual camera.

According to the exemplary embodiment, since a virtual image obtained by mapping a texture on the plate-shaped polygon arranged in the virtual space is generated, more visual effects for having the user actually feel augmented reality can be provided.

In an exemplary embodiment, the information processing program further includes position calculation instructions for calculating positional relation between the image pick-up apparatus and the search target based on the image of the subject and virtual camera arrangement instructions for arranging the virtual camera in accordance with the positional relation calculated in accordance with the position calculation instructions.

According to the exemplary embodiment, since an image picked up by a virtual camera arranged in accordance with positional relation between the image pick-up apparatus and the search target is generated as the virtual image, such display as if an event occurred in a real world can be provided and hence more visual effects for having the user actually feel augmented reality can be provided.

An exemplary embodiment provides an information processing apparatus connected to an image pick-up apparatus and a display. The information processing apparatus includes an image obtaining unit, a search target detection unit, a distance calculation unit, an event occurrence unit, a virtual image generation unit, and a display control unit. The image obtaining unit obtains an image of a subject picked up by the image pick-up apparatus. The search target detection unit detects a search target from the image of the subject obtained by the image obtaining unit. The distance calculation unit calculates a distance between the image pick-up apparatus and the search target based on the image of the subject. The event occurrence unit causes an event to occur in a virtual space in accordance with the distance between the image pick-up apparatus and the search target calculated by the distance calculation unit. The virtual image generation unit generates a virtual image by shooting the event that occurs by means of the event occurrence unit with a virtual camera arranged in the virtual space. The display control unit causes the display to display the virtual image such that it is visually recognized by a user as superimposed on the image of the subject or on the subject seen through a screen of the display.

According to the exemplary embodiment, since an event can be caused to occur in the virtual space in accordance with the calculated distance between the image pick-up apparatus and the search target, an event as intended by a user can be caused to occur by utilizing the detected search target.

An exemplary embodiment provides an information processing method processed by a control unit of an information processing apparatus connected to an image pick-up apparatus and a display. The information processing method includes the steps of obtaining an image of a subject picked up by the image pick-up apparatus, detecting a search target from the obtained image of the subject, calculating a distance between the image pick-up apparatus and the search target based on the image of the subject, causing an event to occur in a virtual space in accordance with the calculated distance between the image pick-up apparatus and the search target, generating a virtual image by shooting the event that occurs with a virtual camera arranged in the virtual space, and causing the display to display the virtual image such that it is visually recognized by a user as superimposed on the image of the subject or on the subject seen through a screen of the display.

According to the exemplary embodiment, since an event can be caused to occur in the virtual space in accordance with the calculated distance between the image pick-up apparatus and the search target, an event as intended by a user can be caused to occur by utilizing the detected search target.

An exemplary embodiment provides an information processing system. The information processing system includes a search target arranged in a subject, an image pick-up apparatus for picking up an image of the subject, an information processing apparatus connected to the image pick-up apparatus, and a display connected to the information processing apparatus. The information processing apparatus includes an image obtaining unit for obtaining the image of the subject picked up by the image pick-up apparatus, a search target detection unit for detecting the search target from the image of the subject obtained by the image obtaining unit, a distance calculation unit for calculating a distance between the image pick-up apparatus and the search target based on the image of the subject, an event occurrence unit for causing an event to occur in a virtual space in accordance with the distance between the image pick-up apparatus and the search target calculated by the distance calculation unit, a virtual image generation unit for generating a virtual image by shooting the event that occurs by means of the event occurrence unit with a virtual camera arranged in the virtual space, and a display control unit for causing the display to display the virtual image such that it is visually recognized by a user as superimposed on the image of the subject or on the subject seen through a screen of the display.

According to the exemplary embodiment, since an event can be caused to occur in the virtual space in accordance with the calculated distance between the image pick-up apparatus and the search target, an event as intended by a user can be caused to occur by utilizing the detected search target.

The foregoing and other objects, features, aspects and advantages of the present invention will become more apparent from the following detailed description of the present invention when taken in conjunction with the accompanying drawings.

Figure 1:
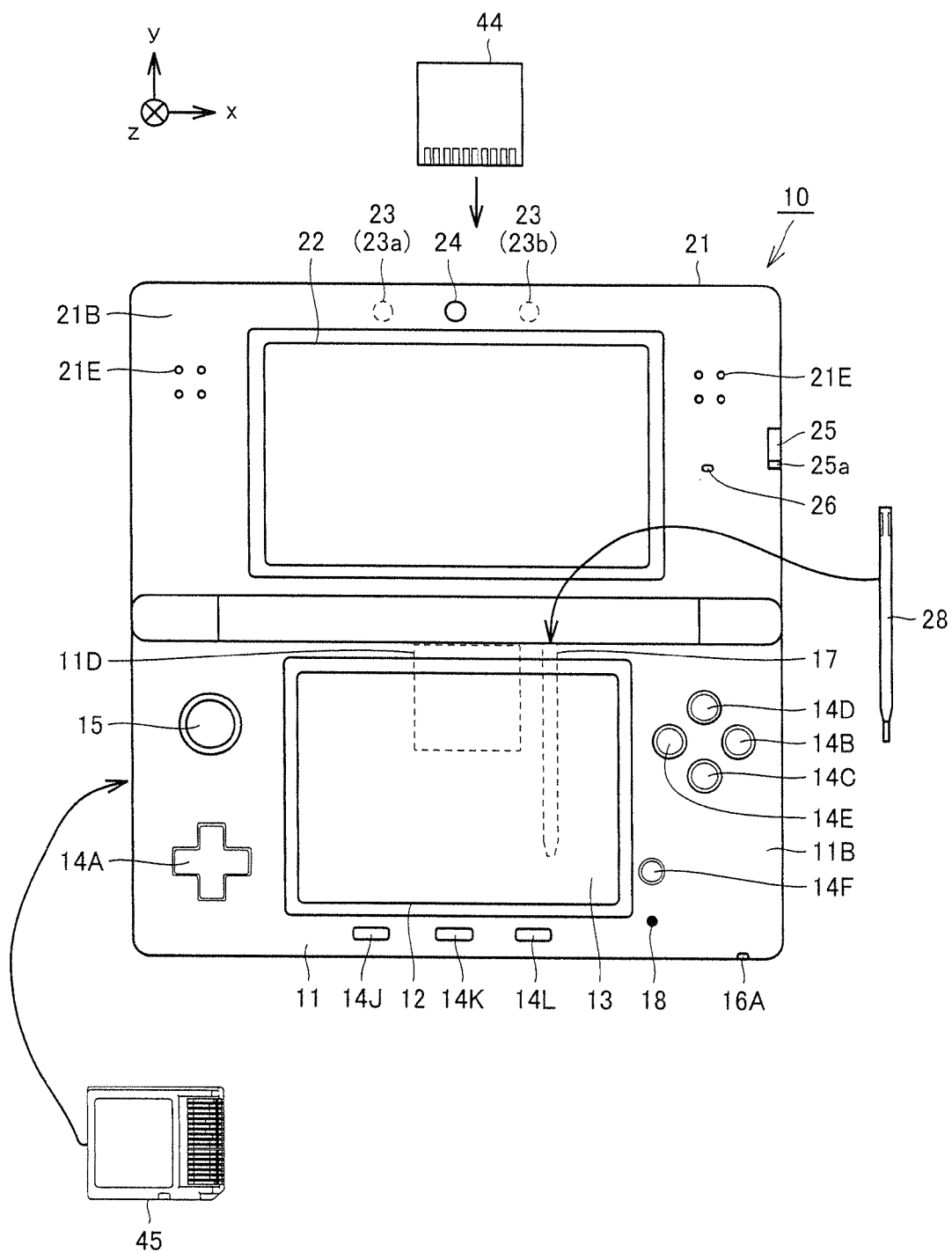
FIG. 1 shows an exemplary illustrative non-limiting front view of an exemplary non-limiting game device in an opened state according to an exemplary embodiment.

DETAILED DESCRIPTION OF NON-LIMITING EXAMPLE EMBODIMENTS (Configuration of Game Device)

A game device according to one embodiment will be described with reference to FIGS. 1 to 5. A game device 10 is a portable game device.

Game device 10 has a lower housing 11 and an upper housing 21. Lower housing 11 and upper housing 21 are connected to each other to allow opening and closing (to be foldable).

(Description of Lower Housing)

Lower housing 11 is provided with a lower LCD (Liquid Crystal Display) 12, a touch panel 13, operation buttons 14A to 14L, an analog stick 15, LEDs 16A to 16B, an insertion port 17, and a microphone hole 18.

Touch panel 13 is attached onto a screen of lower LCD 12. In an upper surface of lower housing 11, insertion port 17 (a dotted line shown in FIGS. 1 and 5) for accommodating a touch pen 28 is provided.

On an inner surface (main surface) of lower housing 11, a cross-shaped button (a direction input button) 14A, a button 14B, a button 14C, a button 14D, a button 14E, a power button 14F, a select button 14J, a HOME button 14K, and a start button 14L are provided.

Analog stick 15 is a device indicating a direction.

In the inner surface of lower housing 11, microphone hole 18 is provided. Under microphone hole 18, a microphone 42 (see FIG. 6) serving as an audio input apparatus is provided.

Figure 2:
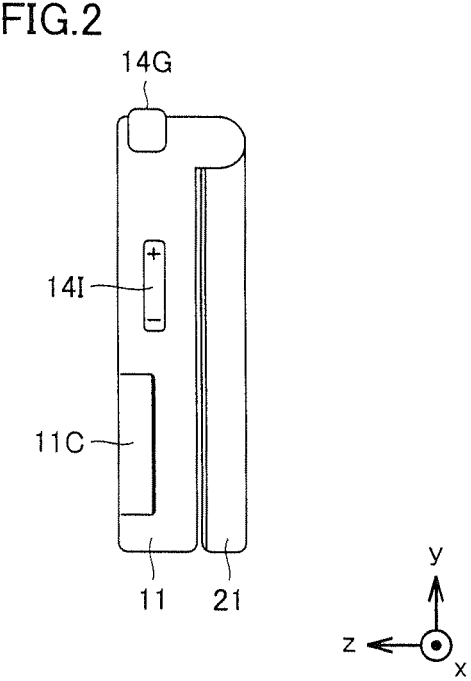
FIG. 2 shows an exemplary illustrative non-limiting left side view of the exemplary non-limiting game device in a closed state according to the exemplary embodiment.
Figure 3:
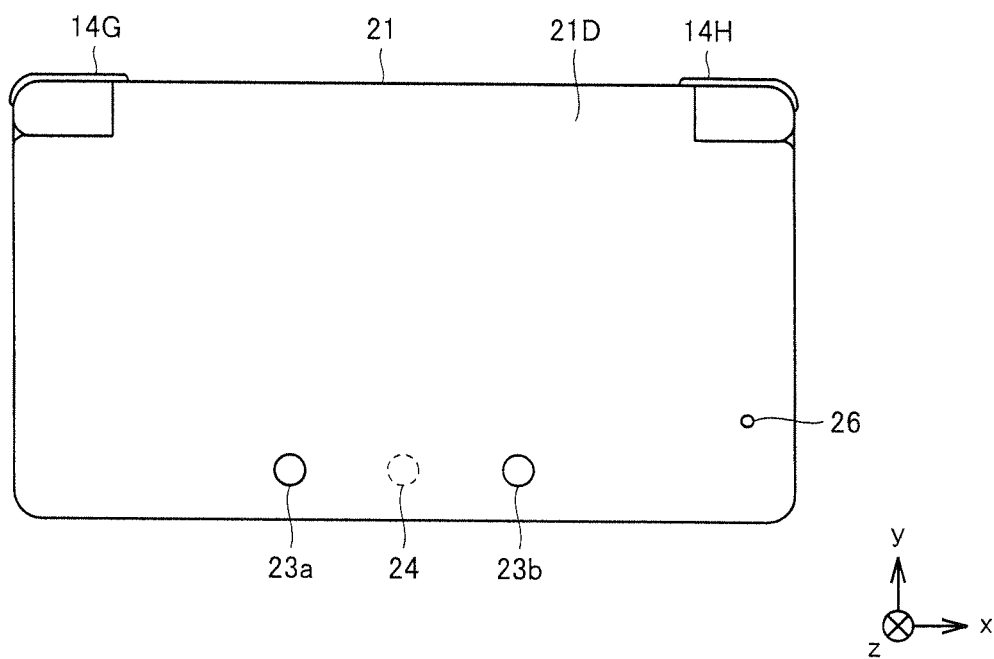
FIG. 3 shows an exemplary illustrative non-limiting top view of the exemplary non-limiting game device in the closed state according to the exemplary embodiment.
Figure 5:
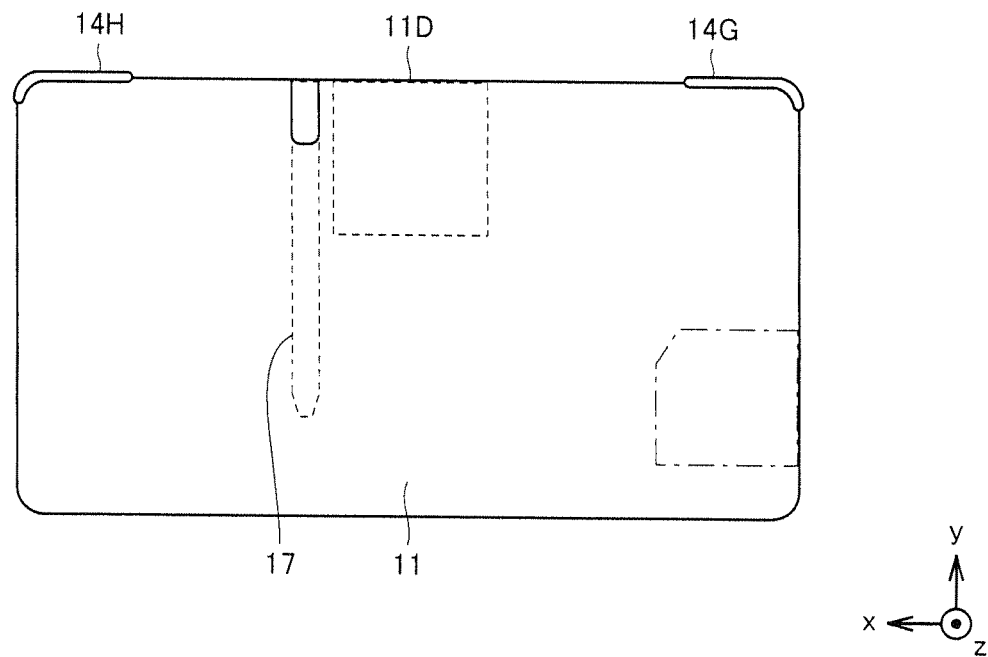
FIG. 5 shows an exemplary illustrative non-limiting bottom view of the exemplary non-limiting game device in the closed state according to the exemplary embodiment.

As shown in FIGS. 3 and 5, an L button 14G and an R button 14H are provided on the upper surface of lower housing 11. In addition, as shown in FIG. 2, on a left side surface of lower housing 11, a sound volume button 14I for adjusting volume of a speaker 43 (see FIG. 6) included in game device 10 is provided.

As shown in FIG. 2, a cover portion 11C that can be opened and closed is provided on the left side surface of lower housing 11. In the inside of this cover portion 11C, a connector for electrically connecting game device 10 and an external memory for data saving 45 to each other is provided.

As shown in FIG. 5, an insertion port 11D for inserting an external memory 44 is provided in the upper surface of lower housing 11.

Figure 4:
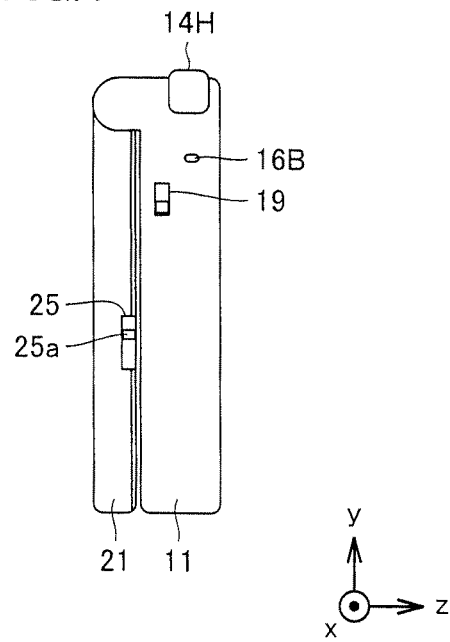
FIG. 4 shows an exemplary illustrative non-limiting right side view of the exemplary non-limiting game device in the closed state according to the exemplary embodiment.

As shown in FIGS. 1 and 4, a first LED 16A for notifying a user of a power ON/OFF state of game device 10 is provided on a lower surface of lower housing 11 and a second LED 16B for notifying the user of a state of establishment of wireless communication of game device 10 is provided on a right side surface of lower housing 11. Game device 10 is capable of establishing wireless communication with other equipment and a wireless switch 19 for activating/inactivating this wireless communication function is provided on the right side surface of lower housing 11 (see FIG. 4).

(Description of Upper Housing)

As shown in FIGS. 1 and 2, upper housing 21 is provided with an upper LCD 22, an outer image pick-up portion 23 (an outer image pick-up portion (left) 23a and an outer image pick-up portion (right) 23b), an inner image pick-up portion 24, a 3D adjustment switch 25, and a 3D indicator 26.

Upper LCD 22 is a display capable of displaying an image that can stereoscopically be viewed. Specifically, upper LCD 22 is a parallax barrier type display allowing stereoscopic vision with naked eyes. Upper LCD 22 can display an image with stereoscopic effect as felt by a user (a stereoscopic image (3D image)) by having the user's left eye visually recognize an image for left eye and the user's right eye visually recognize an image for right eye by using a parallax barrier. In addition, upper LCD 22 can inactivate the parallax barrier above, and when the parallax barrier is inactivated, an image can two-dimensionally be displayed. Thus, upper LCD 22 is a display capable of switching between a stereoscopic display mode for displaying a stereoscopic image and a two-dimensional display mode for two-dimensionally displaying an image (displaying a two-dimensional image). Switching between the display modes is made, for example, by 3D adjustment switch 25 which will be described later.

Outer image pick-up portion 23 is a generic name of two image pick-up portions (23a and 23b) provided on an outer surface 21D of upper housing 21. Outer image pick-up portion (left) 23a and outer image pick-up portion (right) 23b can be used as stereo cameras by a program executed by game device 10.

Inner image pick-up portion 24 is an image pick-up portion provided on an inner surface 21B of upper housing 21 and having an inward direction of normal to the inner surface as a direction of image pick-up.

Three-D adjustment switch 25 is a slide switch and it is a switch used for switching between the display modes of upper LCD 22 as described above. In addition, 3D adjustment switch 25 is used for adjusting stereoscopic effect of an image that is displayed on upper LCD 22 and can stereoscopically be viewed (a stereoscopic image). A slider 25a of 3D adjustment switch 25 can be slid to any position in a prescribed direction (a vertical direction) and a display mode of upper LCD 22 is set in accordance with a position of slider 25a. Further, how a stereoscopic image is viewed is adjusted in accordance with a position of slider 25a.

Three-D indicator 26 is an LED indicating whether upper LCD 22 is in a stereoscopic display mode or not.

Further, a speaker hole 21E is provided in the inner surface of upper housing 21. Voice and sound from speaker 43 which will be described later is output from this speaker hole 21E.

(Internal Configuration of Game Device 10)

Figure 6:
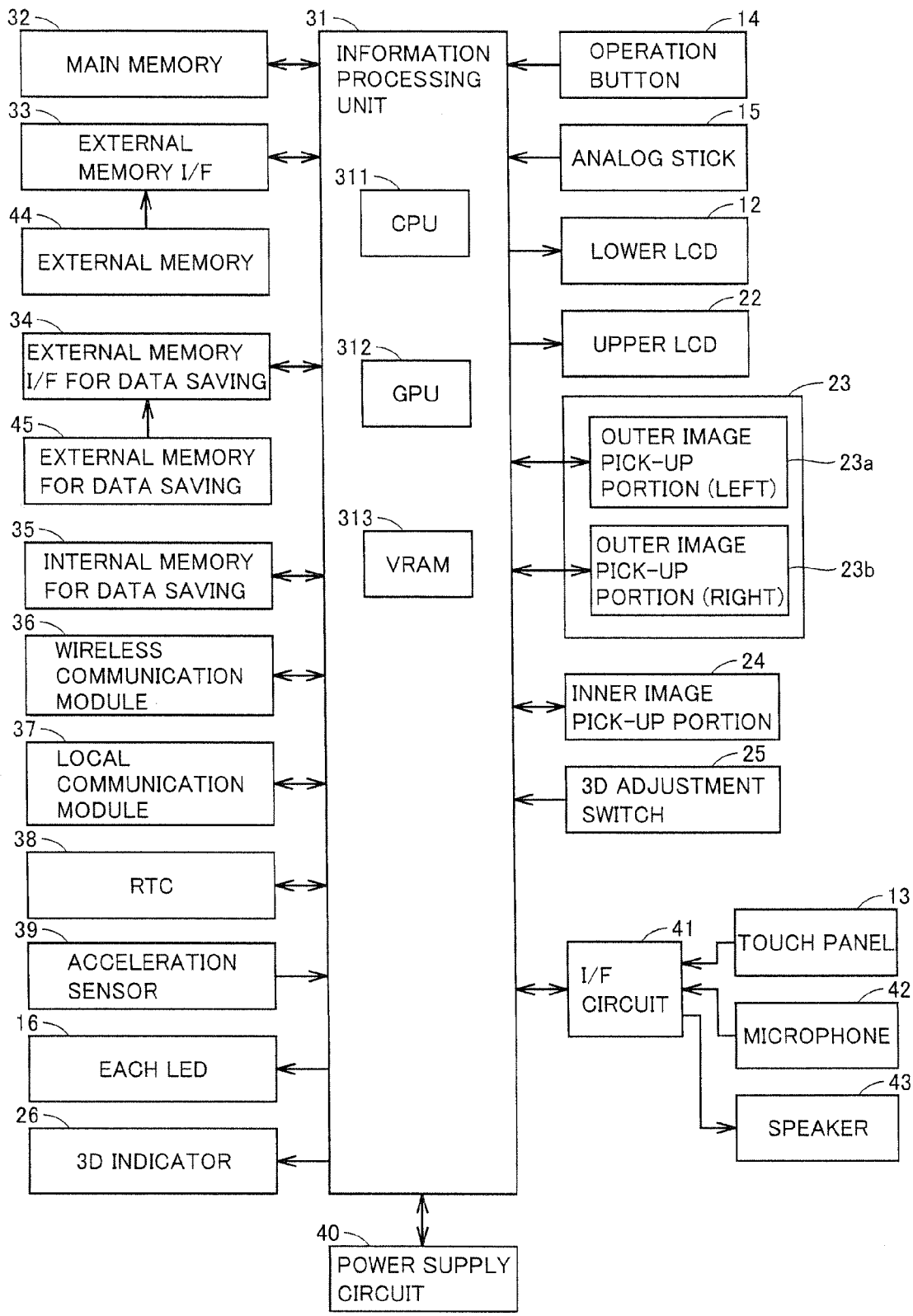
FIG. 6 shows an exemplary illustrative non-limiting block diagram showing an internal structure of the exemplary non-limiting game device according to the exemplary embodiment.

An internal electrical configuration of game device 10 will be described with reference to FIG. 6. As shown in FIG. 6, game device 10 includes, in addition to each portion described above, such electronic components as an information processing unit 31, a main memory 32, an external memory interface (external memory I/F) 33, an external memory I/F for data saving 34, an internal memory for data saving 35, a wireless communication module 36, a local communication module 37, a real time clock (RTC) 38, an acceleration sensor 39, a power supply circuit 40, and an interface circuit (I/F circuit) 41.

Information processing unit 31 includes a CPU (Central Processing Unit) 311 for executing a prescribed program, a GPU (Graphics Processing Unit) 312 for performing image processing, and a VRAM (Video RAM) 313. CPU 311 performs processing in accordance with a program by executing the program stored in a memory in game device 10 (such as external memory 44 connected to external memory I/F 33 or internal memory for data saving 35). It is noted that a program executed by CPU 311 may be obtained from other equipment through communication with other equipment. GPU 312 generates an image in response to an instruction from CPU 311 and renders the image in VRAM 313. The image rendered in VRAM 313 is output to upper LCD 22 and/or lower LCD 12 so that the image is displayed on upper LCD 22 and/or lower LCD 12.

External memory I/F 33 is an interface for removably connecting external memory 44. In addition, external memory I/F for data saving 34 is an interface for removably connecting external memory for data saving 45.

Main memory 32 is a volatile storage device used as a work area or a buffer area of (CPU 311 of) information processing unit 31.

External memory 44 is a non-volatile storage device for storing a program and the like executed by information processing unit 31. External memory 44 is implemented, for example, by a read-only semiconductor memory.

External memory for data saving 45 is implemented by a non-volatile readable and writable memory (such as a NAND type flash memory) and used for saving any data.

Internal memory for data saving 35 is implemented by a non-volatile readable and writable memory (such as a NAND type flash memory) and used for storing prescribed data. For example, internal memory for data saving 35 stores data or a program downloaded through wireless communication via wireless communication module 36.

Wireless communication module 36 has a function to establish connection to wireless LAN under a scheme complying, for example, with IEEE802.11b/g standard. Local communication module 37 has a function to establish wireless communication with a game device of the same type under a prescribed communication scheme (such as communication under an original protocol or infrared communication).

Acceleration sensor 39 detects magnitude of acceleration in a direction of a straight line (linear acceleration) along each direction of three axes (xyz axes). Information processing unit 31 can detect an orientation or motion of game device 10 as it receives data indicating acceleration (acceleration data) detected by acceleration sensor 39.

RTC 38 counts time and outputs the time to information processing unit 31. Information processing unit 31 calculates the current time (date) based on the time counted by RTC 38. Power supply circuit 40 controls electric power from a power supply (a chargeable battery) included in game device 10 and causes supply of electric power to each component in game device 10.

Touch panel 13, microphone 42 and speaker 43 are connected to I/F circuit 41. I/F circuit 41 includes an audio control circuit for controlling microphone 42 and speaker 43 (an amplifier) and a touch panel control circuit for controlling the touch panel. The audio control circuit carries out A/D conversion and D/A conversion of an audio signal and conversion of an audio signal to audio data in a prescribed format. The touch panel control circuit generates touch position data in a prescribed format based on a signal from touch panel 13 and outputs the touch position data to information processing unit 31. As information processing unit 31 obtains the touch position data, it can know a position where input onto touch panel 13 has been made.

Operation button 14 consists of operation buttons 14A to 14L above and operation data indicating a status of input to operation buttons 14A to 14I (whether an operation button has been pressed or not) is output from operation button 14 to information processing unit 31.

Lower LCD 12 and upper LCD 22 are connected to information processing unit 31. Specifically, information processing unit 31 is connected an LCD controller (not shown) of upper LCD 22 and controls the LCD controller to turn ON/OFF the parallax barrier. When the parallax barrier of upper LCD 22 is turned ON, an image for right eye and an image for left eye stored in VRAM 313 of information processing unit 31 are output to upper LCD 22. More specifically, the LCD controller reads the image for right eye and the image for left eye from VRAM 313 by alternately repeating processing for reading pixel data for one line in a vertical direction with regard to the image for right eye and processing for reading pixel data for one line in the vertical direction with regard to the image for left eye. Thus, the image for right eye and the image for left eye are each divided into strip-like images in which pixels are aligned vertically for each one line, and an image in which strip-like images of the image for right eye and strip-like images of the image for left eye as divided are alternately arranged is displayed on a screen of upper LCD 22. Then, as the image is visually recognized by the user through the parallax barrier of upper LCD 22, the user's right and left eyes visually recognize the image for right eye and the image for left eye respectively. As described above, an image that can stereoscopically be viewed is displayed on the screen of upper LCD 22.

Outer image pick-up portion 23 and inner image pick-up portion 24 pick up an image in response to an instruction from information processing unit 31 and output data of the picked-up image to information processing unit 31.

Three-D adjustment switch 25 transmits an electric signal in accordance with a position of slider 25a to information processing unit 31.

Information processing unit 31 controls illumination of 3D indicator 26. For example, when upper LCD 22 is in a stereoscopic display mode, information processing unit 31 causes 3D indicator 26 to illuminate.

(Outlines of Game)

Outlines of a game 1 to a game 3 executed on game device 10 will be described with reference to FIGS. 7 to 13. Game 1 to game 3 are games making use of an augmented reality technique and played while an image of a marker 50 in a prescribed design (a character, a number, a symbol, other designs) drawn in a note coming together with game software is picked up by outer image pick-up portion 23 of game device 10.

Figure 7:
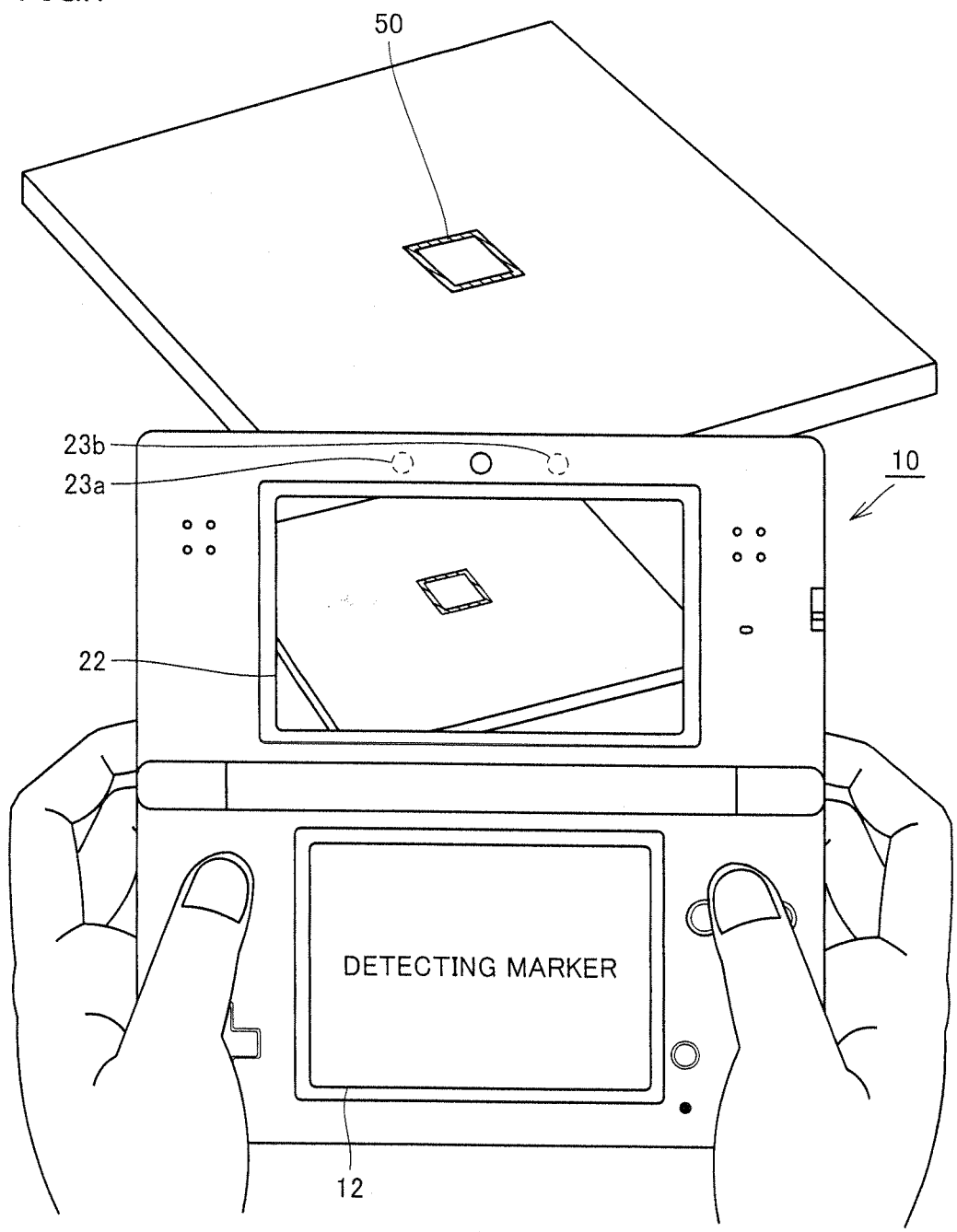
FIGS. 7 to 13 each show an exemplary illustrative non-limiting game image of the exemplary non-limiting game device according to the exemplary embodiment while a game is being played.

Initially, outlines of game 1 executed on game device 10 will be described. A game image example shown in FIG. 7 shows a game image displayed on upper LCD 22 and lower LCD 12 when marker 50 is detected immediately after game 1 is started.

On upper LCD 22, an image of a note (a subject) currently picked up by outer image pick-up portion 23 and an image of marker 50 drawn in the note are displayed. In this example, marker 50 is a square marker arranged substantially in a central portion of the note.

On lower LCD 12, information indicating that marker 50 is being detected (for example, "detecting marker") is displayed. When game device 10 failed to detect marker 50, game device 10 may display such information as "Marker has not been detected. Please perform again processing for detecting marker." on lower LCD 12. When game device 10 detects marker 50, game device 10 may display such information as "Marker has been detected." on lower LCD 12.

Figure 8:
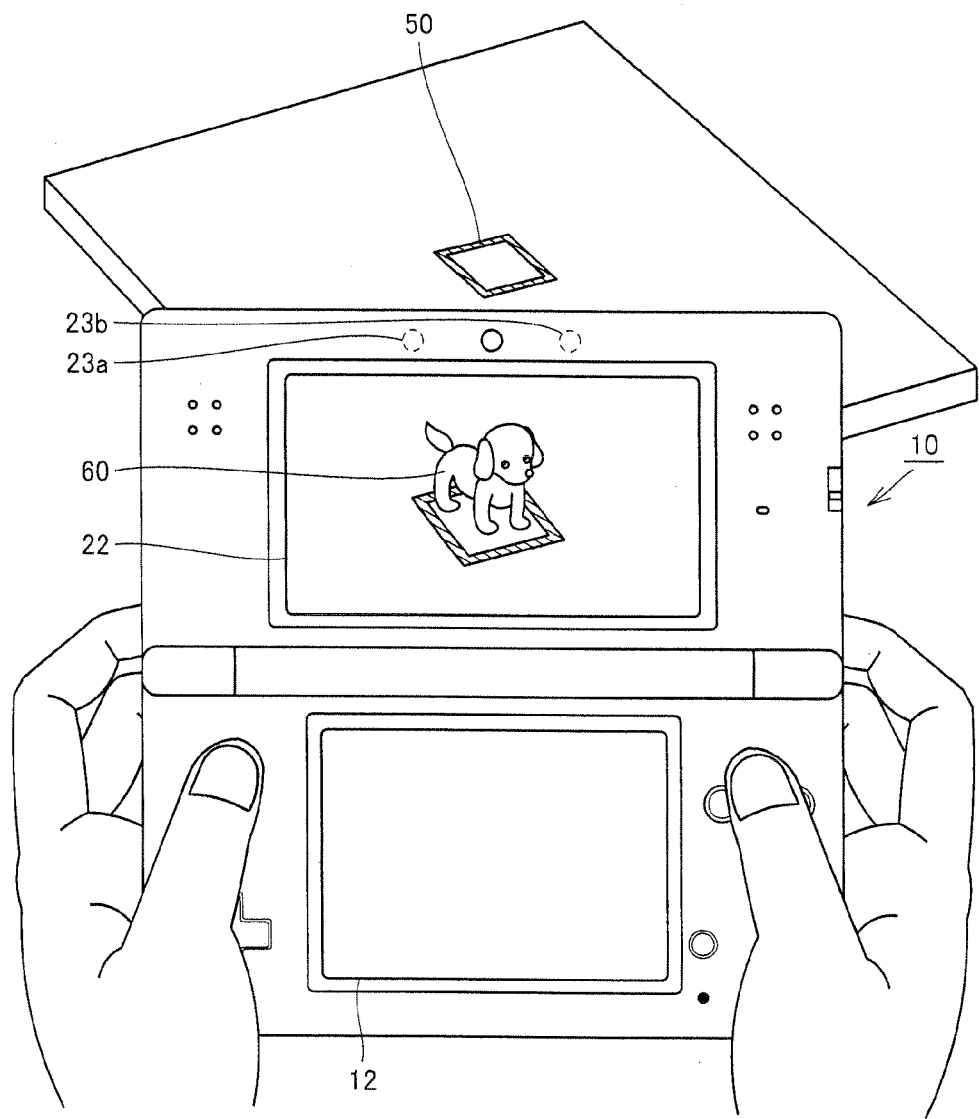

Game device 10 causes a first event to occur as it comes closer to the note while marker 50 is being detected such that a distance between outer image pick-up portion 23 and marker 50 is equal to or smaller than a prescribed distance (for example, a prescribed distance being set to 10 cm). It is noted that, even when the distance between outer image pick-up portion 23 and marker 50 is not equal to or smaller than the prescribed distance, the first event may be caused to occur when marker 50 is detected. As a result of the first event that occurred, a character object 60 arranged on marker 50 is displayed on upper LCD 22 as shown in FIG. 8. It is noted that, in order to provide the game with an effect, game device 10 may reproduce a motion picture in a region within marker 50 on upper LCD 22.

Then, outlines of a game 2 executed on game device 10 will now be described. Marker 50 used in game 2 has an outer marker 50a (a first search target) and an inner marker 50b (a second search target) arranged as encompassed in outer marker 50a. In this example, outer marker 50a and inner marker 50b are markers each in a square shape.

Figure 9:
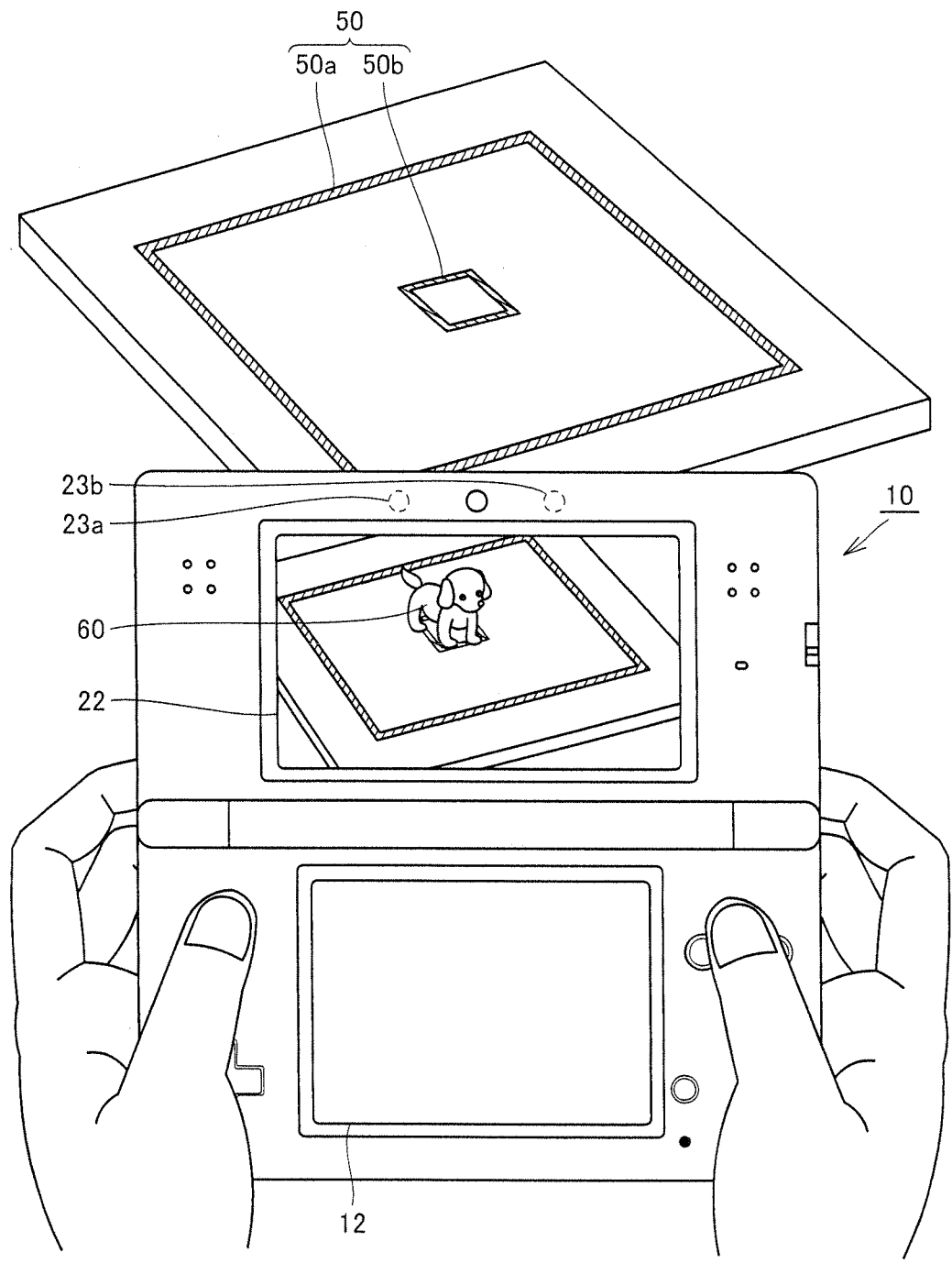

Initially, game device 10 obtains an image of a note currently picked up by outer image pick-up portion 23 and detects outer marker 50a from the obtained image of the note. As game device 10 comes closer to the note while outer marker 50a is being detected such that the distance between outer image pick-up portion 23 and outer marker 50a is set to a first distance (for example, a first distance being set to 30 cm), the first event is caused to occur. As a result of the first event that occurred, on upper LCD 22, as shown in FIG. 9, character object 60 arranged on inner marker 50b is displayed. It is noted that, in order to provide the game with an effect, game device 10 may reproduce a motion picture in the region within marker 50a on upper LCD 22.

Game device 10 may display description of the game on lower LCD 12. For example, game device 10 displays such information as "come closer" on lower LCD 12. Such an indication is a guide for having the user make transition to the second event.

Figure 10:
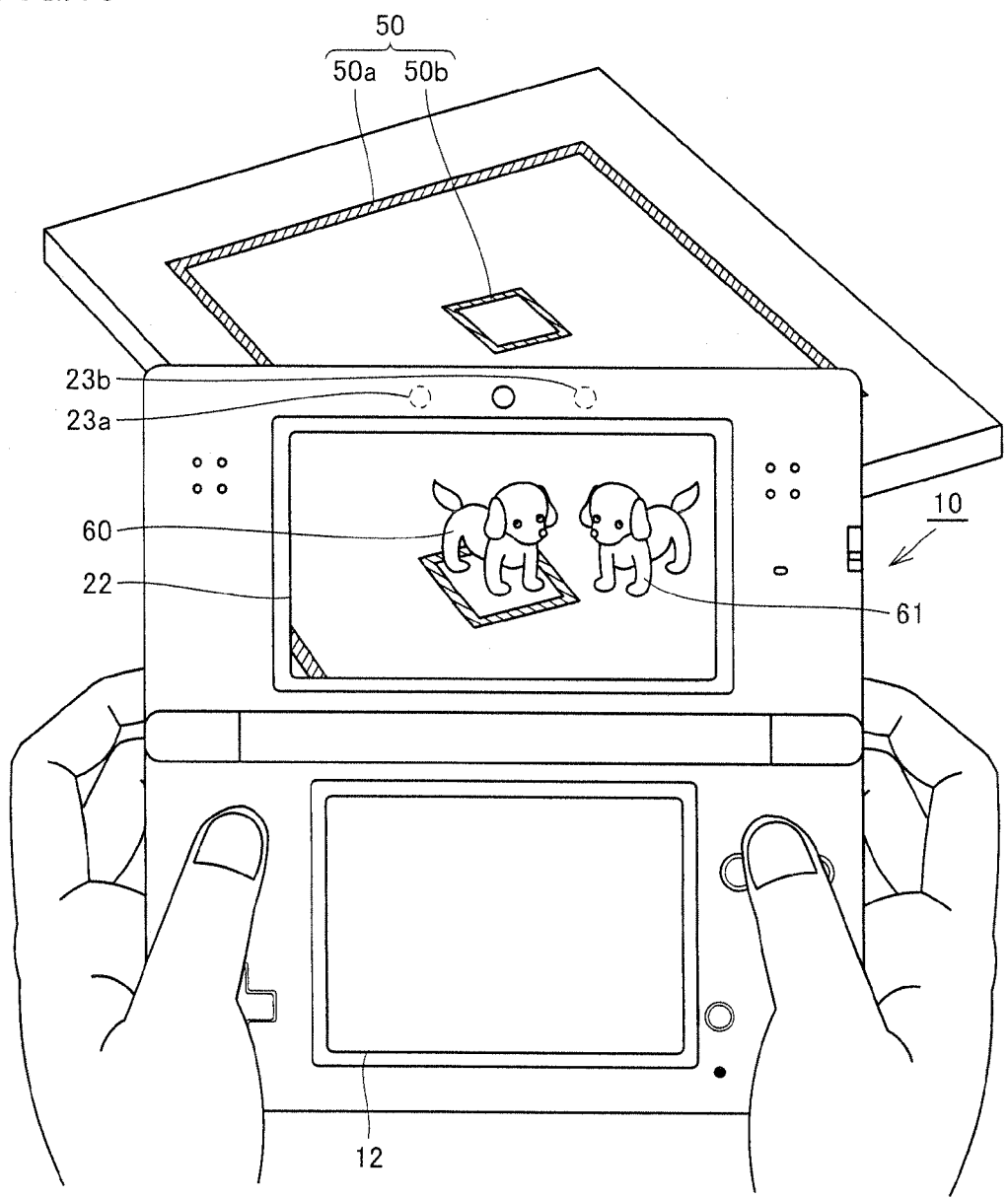

Then, after the processing of the first event ended, game device 10 obtains the image of the note picked up by outer image pick-up portion 23 and detects inner marker 50b from the obtained image of the note. As game device 10 comes closer to the note while inner marker 50b is being detected such that a distance between outer image pick-up portion 23 and inner marker 50b is set to a second distance (for example, a second distance being set to 10 cm), the second event is caused to occur. As a result of the second event that occurred, on upper LCD 22, as shown in FIG. 10, character object 60 arranged on inner marker 50b and another character object 61 arranged in the vicinity of character object 60 are displayed.

It is noted that game device 10 detects outer marker 50a and inner marker 50b in separate processing during execution of game 2, however, the present invention is not limited thereto and outer marker 50a and inner marker 50b may be detected from the obtained image of the note in the same processing.

Outlines of game 3 executed on game device 10 will now be described. Marker 50 used in game 3 has outer marker 50a and four inner markers 50b arranged as encompassed in outer marker 50a. In this example, outer marker 50a and four inner markers 50b are markers each in a square shape.

Figure 11:
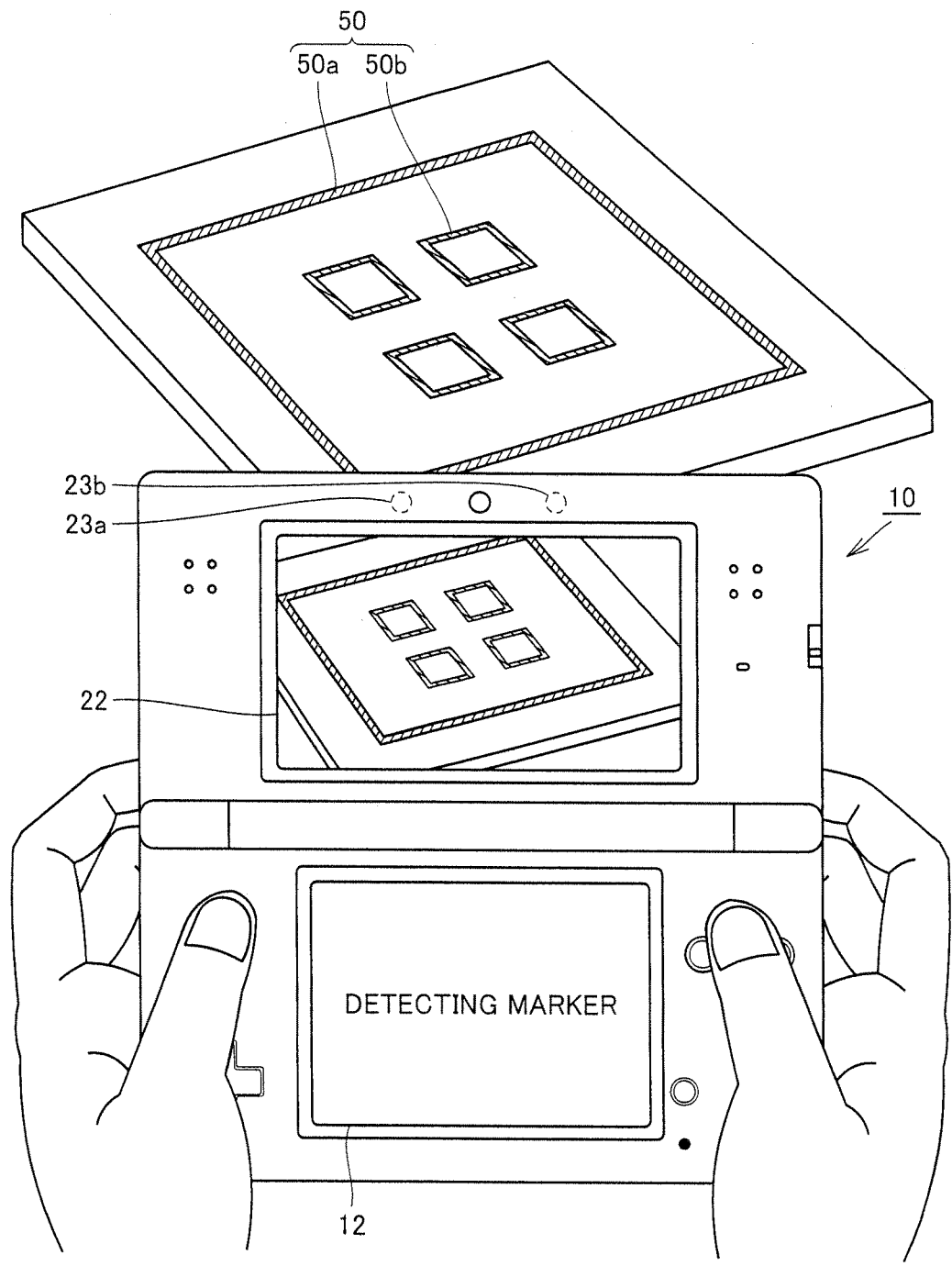

Initially, a game image example shown in FIG. 11 shows a game image displayed on upper LCD 22 and lower LCD 12 when outer marker 50a is detected immediately after the start of game 3.

On upper LCD 22, the image of the note currently picked up by outer image pick-up portion 23 and the image of marker 50 (outer marker 50a and four inner markers 50b) drawn in the note are displayed. On lower LCD 12, information indicating that marker 50 is being detected (for example, "detecting marker") is displayed.

Figure 12:
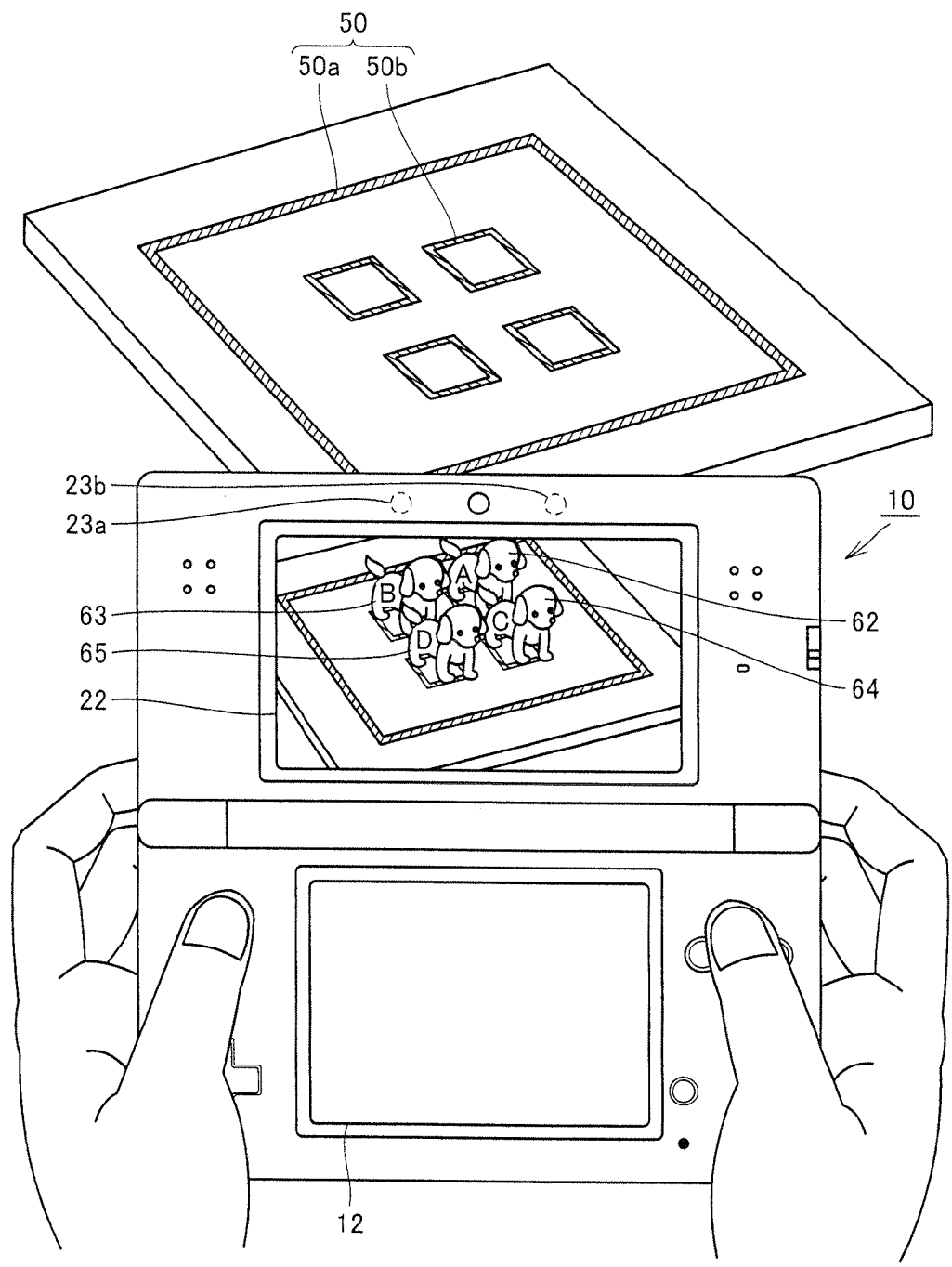

Game device 10 obtains the image of the note currently picked by outer image pick-up portion 23 and detects outer marker 50a from the obtained image of the note. When game device 10 detects outer marker 50a, the first event is caused to occur. As a result of the first event that occurred, on upper LCD 22, a character object A 62, a character object B 63, a character object C 64, and a character object D 65 arranged on four inner markers 50b respectively are displayed as shown in FIG. 12. It is noted that game device 10 may reproduce a motion picture in the region within marker 50a of upper LCD 22 in order to provide the game with an effect.

As the first event occurs, game device 10 displays description of the game on lower LCD 12 and gives a quiz to the user. Here, character object A 62, character object B 63, character object C 64, and character object D 65 serve as choices of answers to the given quiz. The user brings game device 10 closer to any of character object A 62, character object B 63, character object C 64, and character object D 65, and selects the answer to the given quiz. Therefore, game device 10 displays such information as "bring game main body to character you think as correct answer" on lower LCD 12. Such an indication serves as a guide for having the user make transition to the second event.

Then, after the processing of the first event ended, game device 10 obtains the image of the note picked up by outer image pick-up portion 23 and detects inner marker 50b from the obtained image of the note. While inner markers 50b are being detected, game device 10 causes the second event to occur, in accordance with inner marker 50b among four inner markers 50b, of which distance from outer image pick-up portion 23 is equal to or smaller than a prescribed distance (for example, a prescribed distance being set to 10 cm).

Figure 13:
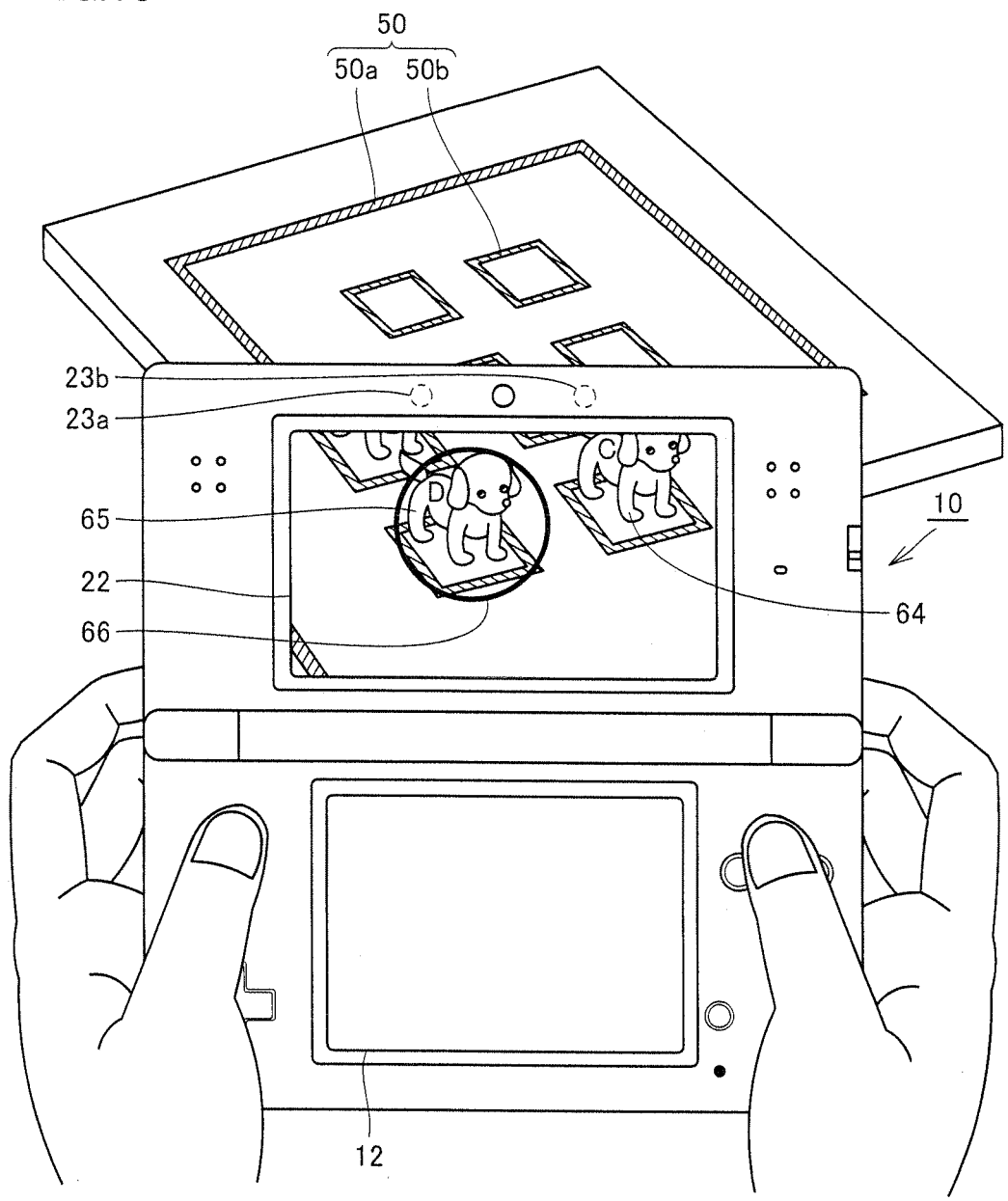

Specifically, in a case where character object D 65 is the correct answer to the quiz, as shown in FIG. 13, game device 10 causes an answer object 66 indicating, the correct answer to be displayed over inner marker 50b located under character object D 65, of which distance from outer image pick-up portion 23 is equal to or smaller than the prescribed distance.

Though not shown, game device 10 causes an answer object indicating an incorrect answer to be displayed over inner marker 50b located under each of character object A 62, character object B 63, and character object C 64, of which distance from outer image pick-up portion 23 is equal to or smaller than the prescribed distance.

It is noted that game device 10 detects outer marker 50a and inner marker 50b in separate processing during execution of game 3, however, the present invention is not limited thereto and outer marker 50a and inner marker 50b may be detected from the obtained image of the note in the same processing.

(Operation of Game Device 10)

An operation of game device 10 when game 3 above is executed will now be described in further detail with reference to FIGS. 14 to 17.

Figure 14:
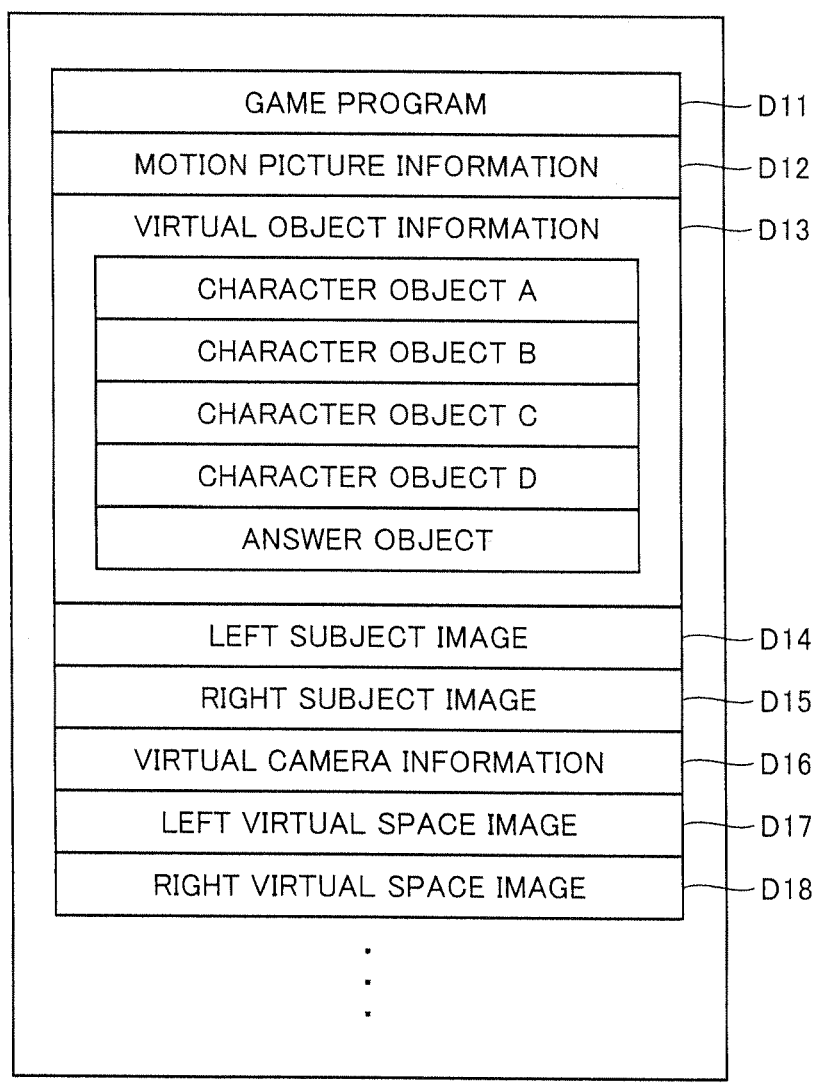
FIG. 14 shows an exemplary illustrative non-limiting schematic diagram showing a memory map of the exemplary non-limiting game device according to the exemplary embodiment.

Main memory 32 shown in FIG. 14 includes a game program D11, motion picture information D12, virtual object information D13, a left subject image D14, a right subject image D15, virtual camera information D16, a left virtual space image D17, a right virtual space image D18, and the like.

Game program D11 is read from external memory 44, internal memory for data saving 35 or the like and stored in main memory 32 prior to play of the game. It is noted that game program D11 may be received from a server apparatus or another game device by using a wireless communication function and stored in main memory 32.

Motion picture information D12 is motion picture information displayed in the first event or the like, and it is motion picture information compressed based on such motion picture compression standards as H.264, MPEG-4 AVC, or the like.

Virtual object information D13 is information relating to various virtual objects (character object A 62 to character object D 65, answer object 66) arranged in the virtual space and it includes such information as a shape, a color, a design, a position, and an orientation of a virtual object.

Left subject image D14 is an image of a subject picked up by outer image pick-up portion (left) 23a and right subject image D15 is an image of a subject picked up by outer image pick-up portion (right) 23b.

Virtual camera information D16 is information on a pair of virtual cameras (a left virtual camera and a right virtual camera which will be described later) used in generating a stereoscopic image, and it includes such information as a position or an orientation of each virtual camera in the virtual space.

Left virtual space image D17 is a virtual image rendered based on the left virtual camera and right virtual space image D18 is a virtual image rendered based on the right virtual camera.

Figure 15:
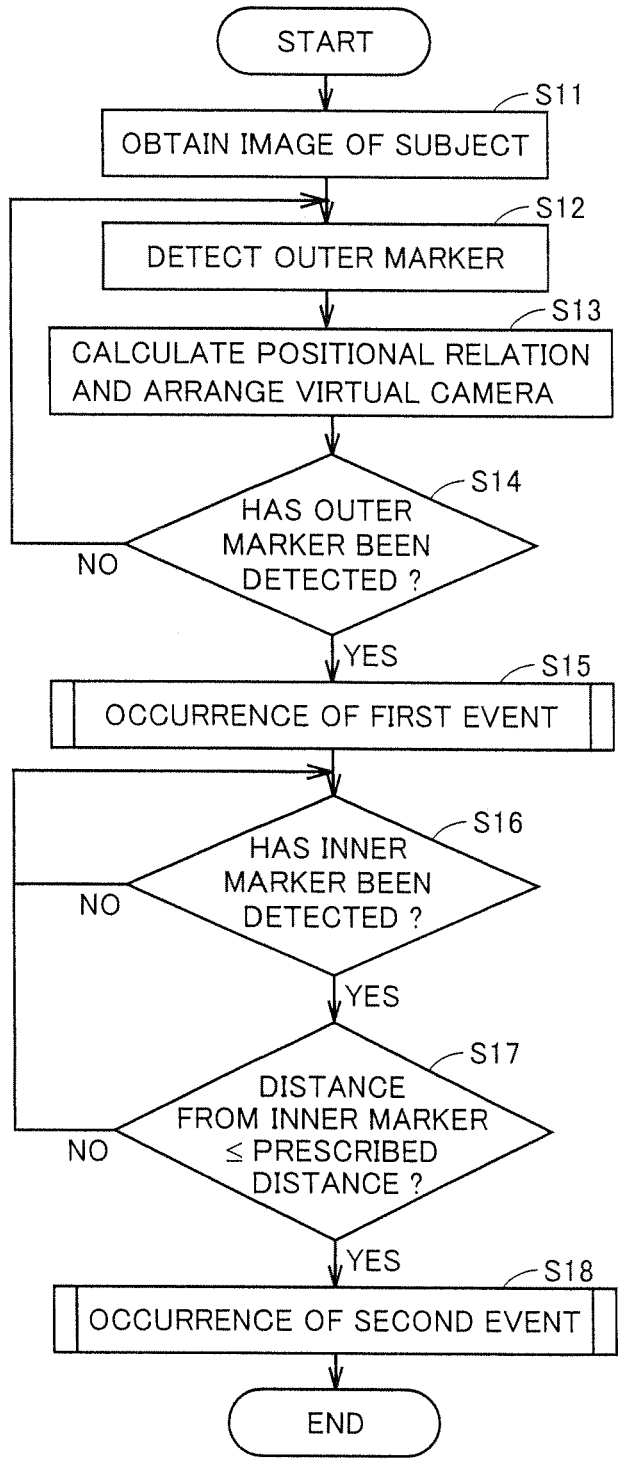
FIG. 15 shows an exemplary illustrative non-limiting flowchart for illustrating an operation of the exemplary non-limiting game device according to the exemplary embodiment.

Flow of game processing performed by CPU 311 based on game program D11 will be described with reference to FIG. 15. The game processing is started, for example, when button 14B of operation button 14 is pressed while an image of a subject is picked up by outer image pick-up portion 23.

Initially, CPU 311 obtains most recent left subject image D14 and right subject image D15 from outer image pick-up portion (left) 23a and outer image pick-up portion (right) 23b and causes main memory 32 to store the images (step S11).

Then, CPU 311 detects outer marker 50a from the obtained image of the subject (step S12). In the marker detection processing, outer marker 50a in each of left subject image D14 and right subject image D15 is detected. For example, left subject image D14 and right subject image D15 are each subjected to edge detection processing and pattern matching processing, so as to detect outer marker 50a in each of left subject image D14 and right subject image D15. Here, in the edge detection processing, a series of edge pixels representing a contour of outer marker 50a is detected from left subject image D14 and right subject image D15 and a plurality of straight lines are generated based on the series of edge pixels, to thereby detect vertices of the contour.

As shown in FIG. 11, outer marker 50a is not limited to the square marker arranged substantially in the central portion of the note, and it may be in any shape so long as it is in a shape that can be detected from the obtained image of the subject. In addition, outer marker 50a is not limited to a single outer marker and a plurality of markers may be arranged in the note.

Then, CPU 311 calculates positional relation between outer image pick-up portion 23 and marker 50 in the real space based on four vertices of marker 50 and calculates a position and an orientation of the virtual camera in the virtual space based on this result of calculation, and the virtual camera is installed such that positional relation between outer image pick-up portion 23 and outer marker 50a in the real space and positional relation between the virtual camera and the marker in the virtual space correspond to each other (step S13). Processing for calculating a position of the virtual camera based on the positional relation above may be similar to that in a conventional augmented reality feeling technique. It is noted that processing for calculating a position and an orientation of the virtual camera in the virtual space and installing the virtual camera is performed at a certain interval and it is performed also during processing of each event which will be described later. In a subsequent flowchart, however, the processing is assumed as being performed at a certain interval including during processing of each event which will be described later, although the description may not be provided. In addition, here, similar processing may be performed also for marker 50b, a virtual camera separate from the virtual camera above may be arranged in the virtual space such that positional relation between outer image pick-up portion 23 and inner marker 50b in the real space and positional relation between the virtual camera and marker 50b in the virtual space correspond to each other, and thus the virtual camera may be used in step S172 which will be described later.

Then, CPU 311 determines whether it has detected outer marker 50a or not (step S14). When CPU 311 determines that it failed to detect outer marker 50a (step S14: NO), the process returns to step S12 and processing for detecting outer marker 50a from the obtained image of the subject is continued. When CPU 311 determines that it has detected outer marker 50a (step S14: YES), CPU 311 causes the first event to occur (step S15).

Figure 16:
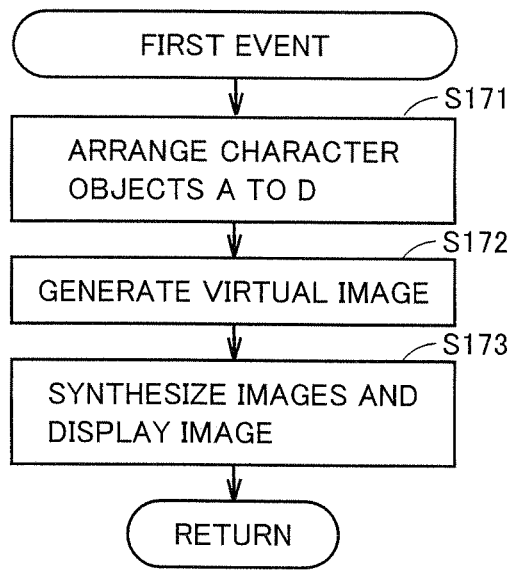
FIG. 16 shows an exemplary illustrative non-limiting flowchart for illustrating processing of a first event shown in FIG. 15.

Processing of the first event that occurred will now be described with reference to FIG. 16. Initially, CPU 311 arranges character object A 62, character object B 63, character object C 64, and character object D 65 at respective prescribed positions with the origin in the virtual space serving as the reference, the origin being the center of outer marker 50a (step S171).

After CPU 311 arranged character object A 62, character object B 63, character object C 64, and character object D 65, CPU 311 generates a virtual image in the virtual space by picking up an image of the virtual space including character object A 62, character object B 63, character object C 64, and character object D 65 with the virtual camera (step S172). Specifically, CPU 311 generates left virtual space image D17 by rendering a virtual object (such as character object A 62) based on the left virtual camera and generates right virtual space image D18 by rendering a virtual object based on the right virtual camera. It is noted that processing for rendering the virtual space is typically performed by GPU 312 in response to an instruction from CPU 311.

After CPU 311 generates a virtual image, CPU 311 synthesizes the image of the subject with the virtual image and causes upper LCD 22 to display the resultant image (step S173). Specifically, CPU 311 overwrites left subject image D14 with left virtual space image D17 (that is, character object A 62 and the like rendered based on the left virtual camera) and overwrites right subject image D15 with right virtual space image D18 (that is, character object A 62 and the like rendered based on the right virtual camera). Then, the synthesized image is displayed on upper LCD 22. Namely, CPU 311 causes upper LCD 22 to display a 3D image, with the synthesized image of left subject image D14 and left virtual space image D17 serving as an image for left eye and the synthesized image of right subject image D15 and right virtual space image D18 serving as an image for right eye. The processing of the first event ends when character object A 62, character object B 63, character object C 64, and character object D 65 are displayed on upper LCD 22.

It is noted that CPU 311 may read motion picture information D12 from main memory 32 and reproduce the motion picture in the region within marker 50. Specifically, a method of reproducing the motion picture in the region within marker 50 will be described. CPU 311 arranges a plate-shaped polygon in the virtual space in response to the first event that occurred. CPU 311 generates a virtual image by mapping an image of motion picture information D12 as a texture on the arranged plate-shaped polygon. CPU 311 reproduces the motion picture by successively displaying the virtual images on upper LCD 22 such that the generated virtual images as superimposed on the image of the subject are visually recognized by the user.

Referring back to FIG. 15, after the processing of the first event ended, CPU 311 obtains most recent left subject image D14 and right subject image D15 from outer image pick-up portion (left) 23a and outer image pick-up portion (right) 23b and detects inner marker 50b from the obtained image of the subject. It is noted that, in the marker detection processing as well, inner marker 50b in each of left subject image D14 and right subject image D15 is detected as in detection of outer marker 50a. For example, by subjecting left subject image D14 and right subject image D15 to edge detection processing and pattern matching processing, inner marker 50b in each of left subject image D14 and right subject image D15 is detected.

Then, CPU 311 determines whether it has detected inner marker 50b or not (step S16). When CPU 311 determines that it failed to detect inner marker 50b (step S16: NO), it continues processing for detecting inner marker 50b. When CPU 311 determines that it has detected inner marker 50b (step S16: YES), it calculates a distance between outer image pick-up portion 23 and inner marker 50b and determines whether the calculated distance (the distance from inner marker 50b) is equal to or smaller than the prescribed distance or not (step S17).

CPU 311 calculates the distance between outer image pick-up portion 23 and inner marker 50b based on the image of the note obtained by outer image pick-up portion 23. Specifically, CPU 311 calculates the distance between outer image pick-up portion 23 and inner marker 50b based on a ratio of inner marker 50b occupied in the image of the note. For example, when the ratio of inner marker 50b occupied in the image of the note is 50%, CPU 311 determines the distance between outer image pick-up portion 23 and inner marker 50b as 30 cm. Alternatively, CPU 311 may calculate positional relation between outer image pick-up portion 23 and marker 50b as in step S13 and calculate a distance between outer image pick-up portion 23 and inner marker 50b based on the calculated result, or it may use a known technique relating to a stereo camera so as to calculate a distance between outer image pick-up portion 23 and inner marker 50b based on the image of the subject obtained by outer image pick-up portions 23a, 23b.

When the first event occurs, game device 10 displays description of the game on lower LCD 12 and gives a quiz to the user. The user brings game device 10 closer to any of character object A 62, character object B 63, character object C 64, and character object D 65, and selects the answer to the given quiz. Therefore, game device 10 calculates a distance between outer image pick-up portion 23 and inner marker 50b and recognizes inner marker 50b of which calculated distance is equal to or smaller than the prescribed distance as the answer selected by the user.

When CPU 311 determines that the calculated distance (the distance from inner marker 50b) is greater than the prescribed distance (step S17: NO), the process returns to step S16, in which processing for detecting inner marker 50b is continued and a distance between outer image pick-up portion 23 and another inner marker 50b is calculated. When CPU 311 determines that the calculated distance (the distance from inner marker 50b) is equal to or smaller than the prescribed distance (step S17: YES), the second event is caused to occur (step S18).

Namely, CPU 311 causes answer object 66 to be displayed (the second event), in accordance with the answer selected by the user (inner marker 50b of which distance is equal to or smaller than the prescribed distance).

Figure 17:
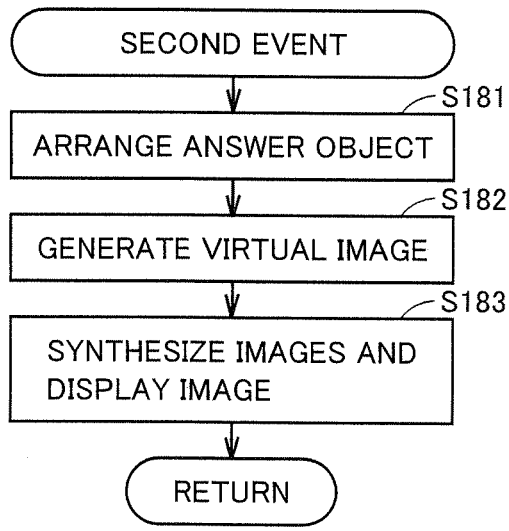
FIG. 17 shows an exemplary illustrative non-limiting flowchart for illustrating processing of a second event shown in FIG. 15.

Processing of the second event that occurred will now be described with reference to FIG. 17. Initially, CPU 311 arranges answer object 66 in accordance with inner marker 50b of which distance is equal to or smaller than the prescribed distance (step S181). Specifically, in a case where character object D 65 is the correct answer to the quiz, when the distance between outer image pick-up portion 23 and inner marker 50b located under character object D 65 is equal to or smaller than the prescribed distance, CPU 311 arranges answer object 66 indicating the correct answer as shown in FIG. 13 as superimposed on character object D 65.

CPU 311 generates a virtual image in the virtual space by picking up an image of the virtual space including character object D 65 on which answer object 66 is arranged as superimposed (step S182). Specifically, CPU 311 generates left virtual space image D17 by rendering character object D 65 on which answer object 66 is arranged as superimposed based on the left virtual camera and generates right virtual space image D18 by rendering character object D 65 on which answer object 66 is arranged as superimposed based on the right virtual camera.

It is noted that, by using the virtual camera arranged in the processing of the first event, it is not necessary to again arrange the virtual camera. If the virtual camera is to be arranged again, CPU 311 again calculates positional relation between outer image pick-up portions 23a, 23b and marker 50 and again arranges a pair of virtual cameras (the left virtual camera and the right virtual camera) in the virtual space based on the positional relation again calculated.

After the virtual image is generated, CPU 311 synthesizes the image of the subject with the virtual image and causes upper LCD 22 to display the resultant image (step S183). Specifically, CPU 311 overwrites left subject image D14 with character object D 65 rendered based on the left virtual camera, on which answer object 66 is arranged as superimposed, and overwrites right subject image D15 with character object D 65 rendered based on the right virtual camera, on which answer object 66 is arranged as superimposed. Thus, the user can be caused to recognize that character object D 65 indicates the correct answer. It is noted that, similarly, the synthesized image is displayed on upper LCD 22. Namely, CPU 311 causes upper LCD 22 to display a 3D image, with the synthesized image of left subject image D14 and left virtual space image D17 serving as an image for left eye and the synthesized image of right subject image D15 and right virtual space image D18 serving as an image for right eye.

Referring back to FIG. 15, CPU 311 ends the game after processing of the second event ended. It is noted that the process may return to step S12 and CPU 311 may continue processing for detecting outer marker 50a from the obtained image of the subject, without ending the game.

As described above, game device 10 according to the embodiment of the present invention obtains an image of a subject picked up by outer image pick-up portion 23, detects marker 50 from the obtained image of the subject, calculates a distance between outer image pick-up portion 23 and marker 50, causes an event to occur in the virtual space in accordance with the calculated distance, generates a virtual image by shooting the event that occurs with a virtual camera arranged in the virtual space, and causes upper LCD 22 to display the virtual image such that the virtual image is visually recognized by the user as superimposed on the image of the subject. Thus, an event as intended by the user can be caused to occur by making use of detected marker 50.

(Variation)

In the embodiment above, upper LCD 22 displays a synthesized image of an image of the subject picked up by outer image pick-up portion 23 and a virtual image (a video see-through type), however, the present invention is not limited as such. In other embodiments, such an optical see-through type game device (for example, a game device including a head-mount display) or game system that a virtual object is displayed on a transmissive type display screen and the virtual object is visually recognized by the user as if the virtual object were actually present in the subject seen through the transmissive type display screen is also applicable.

Moreover, in the embodiment above, though a position and an orientation of the left virtual camera and a position and an orientation of the right virtual camera are individually determined in accordance with results in the marker detection processing, in other embodiments, a position and an orientation of any one virtual camera may be determined in accordance with results in the marker detection processing and thereafter a position and an orientation of the other virtual camera may be determined based on the position and the orientation of one virtual camera.

Further, in the embodiment above, though a position and an orientation of the virtual camera are determined based on a position and an orientation of marker 50 included in the image of the subject, in other embodiments, a position or the like of the virtual camera may be determined based on a position or the like of a recognition target (for example, a face, a hand, and the like) other than marker 50 included in the image of the subject.

Furthermore, in the embodiment above, though an example where a stereoscopic image is displayed on upper LCD 22 has been described, the present invention is also applicable to a case where a two-dimensional image is displayed, without limited as such. For example, one virtual camera should only be arranged in the virtual space based on the image of the subject obtained from any one of outer image pick-up portion (left) 23a and outer image pick-up portion (right) 23b and then processing as in the embodiment above should only be performed.

Further, in the embodiment above, though an example where a note where marker 50 is drawn is used has been described, the present invention is not limited as such and is applicable also to a case where marker 50 is drawn on a common credit card or a card having a size as large as a business card. Here, a card in which marker 50 is drawn may simply be referred to as a marker.

In addition, in the embodiment above, though an example in which processing of game program D11 is performed by the CPU (CPU 311) has been described, in other embodiments, at least partial processing of game program D11 may be performed only by hardware.

Moreover, in the embodiment above, though description has been given with reference to the game example above, the embodiment is applicable to any such game as causing an event to occur as the shape of marker 50 changes, without limited as such. Any application software is also applicable, without limited to game software.

Furthermore, in the embodiment above, though portable game device 10 has been described, in other embodiments, any information processing apparatus (a stationary game device, a desktop personal computer, a notebook personal computer, a portable telephone, and the like) may be made use of as a game device or a game system.

In addition, in the embodiment above, though an example where processing of game program D11 is performed by a single CPU (CPU 311) has been described, in other embodiments, processing of game program D11 may be performed by a plurality of processors as distributed. The plurality of processors may be contained in the same information processing apparatus or may be provided as distributed in a plurality of information processing apparatuses capable of communicating with one another, such as a server apparatus and a client apparatus.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory storage medium encoded with a computer readable information processing program and executable by a computer of an information processing apparatus connected to an image pick-up apparatus and a display, said information processing program comprising:

image obtaining instructions for obtaining an image of a subject picked up by said image pick-up apparatus;
   search target detection instructions for detecting a search target from the image of said subject obtained in accordance with said image obtaining instructions;
   distance calculation instructions for calculating a distance between said image pick-up apparatus and said search target based on the image of said subject;
   event occurrence instructions for causing an event to occur in a virtual space in accordance with the distance between said image pick-up apparatus and said search target calculated in accordance with said distance calculation instructions;
   virtual image generation instructions for generating a virtual image by shooting said event that occurs in accordance with said event occurrence instructions with a virtual camera arranged in said virtual space; and
   display control instructions for causing said display to display said virtual image such that it is visually recognized by a user as superimposed on the image of said subject or on said subject seen through a screen of said display.

2. The non-transitory storage medium according to claim 1, wherein said event occurrence instructions are adapted to cause said event to occur when the distance between said image pick-up apparatus and said search target calculated in accordance with said distance calculation instructions is equal to or smaller than a prescribed distance.

3. The non-transitory storage medium according to claim 2, wherein
said search target includes a first search target and a second search target arranged as encompassed in said first search target, and
said event occurrence instructions are adapted to cause a first event to occur when a distance between said image pick-up apparatus and said first search target is equal to or smaller than a first distance and to cause a second event to occur when a distance between said image pick-up apparatus and said second search target is equal to or smaller than a second distance.

4. The non-transitory storage medium according to claim 2, wherein
said search target includes a first search target and a second search target arranged as encompassed in said first search target, and
said event occurrence instructions are adapted to cause said event to occur in accordance with a second search target, among a plurality of said second search targets, of which distance from said image pick-up apparatus is equal to or smaller than a prescribed distance.

5. The non-transitory storage medium according to claim 4, wherein
said event occurrence instructions are adapted to cause a first event to occur when a distance between said image pick-up apparatus and said first search target is equal to or smaller than a first distance and to cause a second event to occur when the distance of a second search target, among the plurality of said second search targets, from said image pick-up apparatus is equal to or smaller than the prescribed distance.

6. The non-transitory storage medium according to claim 4, wherein
said event occurrence instructions are adapted to cause a first event to occur when said first search target is detected and to cause a second event to occur when the distance of a second search target, among the plurality of said second search targets, from said image pick-up apparatus is subsequently equal to or smaller than the prescribed distance.

7. The non-transitory storage medium according to claim 1, wherein
said event that occurred in accordance with said event occurrence instructions includes an object in a prescribed shape arranged in said virtual space, and
said virtual image generation instructions are adapted to generate said virtual image by shooting the object in said prescribed shape with said virtual camera.

8. The non-transitory storage medium according to claim 7, wherein
said event that occurred in accordance with said event occurrence instructions includes a plate-shaped polygon arranged in said virtual space, and
said virtual image generation instructions are adapted to generate said virtual image by mapping a texture on said plate-shaped polygon and shooting the polygon with said virtual camera.

9. The non-transitory storage medium according to claim 1, wherein
said information processing program further comprises:

position calculation instructions for calculating positional relation between said image pick-up apparatus and said search target based on the image of said subject; and
virtual camera arrangement instructions for arranging said virtual camera in accordance with said positional relation calculated in accordance with said position calculation instructions.

10. An information processing apparatus connected to an image pick-up apparatus and a display, comprising:
an image obtaining unit for obtaining an image of a subject picked up by said image pick-up apparatus;
a search target detection unit for detecting a search target from the image of said subject obtained by said image obtaining unit;
a distance calculation unit for calculating a distance between said image pick-up apparatus and said search target based on the image of said subject;
an event occurrence unit for causing an event to occur in a virtual space in accordance with said distance between said image pick-up apparatus and said search target calculated by said distance calculation unit;
a virtual image generation unit for generating a virtual image by shooting said event that occurs by means of said event occurrence unit with a virtual camera arranged in said virtual space; and
a display control unit for causing said display to display said virtual image such that it is visually recognized by a user as superimposed on the image of said subject or on said subject seen through a screen of said display.

11. An information processing method processed by a control unit of an information processing apparatus connected to an image pick-up apparatus and a display, comprising the steps of:
obtaining an image of a subject picked up by said image pick-up apparatus;
detecting a search target from the obtained image of said subject;
calculating a distance between said image pick-up apparatus and said search target based on the image of said subject;
causing an event to occur in a virtual space in accordance with calculated said distance between said image pick-up apparatus and said search target;
generating a virtual image by shooting said event that occurs with a virtual camera arranged in said virtual space; and
causing said display to display said virtual image such that it is visually recognized by a user as superimposed on the image of said subject or on said subject seen through a screen of said display.

12. An information processing system, comprising:
a search target arranged in a subject;
an image pick-up apparatus for picking up an image of said subject;
an information processing apparatus connected to said image pick-up apparatus; and
a display connected to said information processing apparatus,
said information processing apparatus including
an image obtaining unit for obtaining the image of the subject picked up by said image pick-up apparatus,
a search target detection unit for detecting said search target from the image of said subject obtained by said image obtaining unit,
a distance calculation unit for calculating a distance between said image pick-up apparatus and said search target based on the image of said subject, an event occurrence unit for causing an event to occur in a virtual space in accordance with said distance between said image pick-up apparatus and said search target calculated by said distance calculation unit, a virtual image generation unit for generating a virtual image by shooting said event that occurs by means of said event occurrence unit with a virtual camera arranged in said virtual space, and a display control unit for causing said display to display said virtual image such that it is visually recognized by a user as superimposed on the image of said subject or on said subject seen through a screen of said display.

* * * * *